United States Patent
Kamiya (10) Patent No.: US 10,525,622 B2
(45) Date of Patent: Jan. 7, 2020

(54) PILLAR GARNISH MANUFACTURING METHOD

(71) Applicant: TOKAI KOGYO CO., LTD., Obu-shi, Aichi (JP)

(72) Inventor: Kohji Kamiya, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 356 days.

(21) Appl. No.: 15/514,133

(22) PCT Filed: Sep. 17, 2015

(86) PCT No.: PCT/JP2015/076524
§ 371 (c)(1),
(2) Date: Mar. 24, 2017

(87) PCT Pub. No.: WO2016/052235
PCT Pub. Date: Apr. 7, 2016

(65) Prior Publication Data
US 2017/0291338 A1 Oct. 12, 2017

(30) Foreign Application Priority Data
Sep. 29, 2014 (JP) .................................. 2014-197904

(51) Int. Cl.
*B29C 45/33* (2006.01)
*B29C 45/14* (2006.01)
(Continued)

(52) U.S. Cl.
CPC ........ *B29C 45/33* (2013.01); *B29C 45/14065* (2013.01); *B29C 45/14336* (2013.01);
(Continued)

(58) Field of Classification Search
CPC .............. B29C 45/33; B29C 45/14065; B29C 45/14336; B29C 45/2602; B29C 45/44; B29C 2045/14147; B29L 2031/3005
See application file for complete search history.

(56) References Cited

U.S. PATENT DOCUMENTS

2005/0140054 A1 6/2005 Kubo et al.
2006/0073727 A1 4/2006 Kimura et al.
(Continued)

FOREIGN PATENT DOCUMENTS

CN 1636697 A 7/2005
CN 1754675 A 4/2006
(Continued)

OTHER PUBLICATIONS

Aug. 29, 2018 Office Action issued in Chinese Patent Application No. 201580051865.3.
(Continued)

*Primary Examiner* — Nathan H Empie
(74) *Attorney, Agent, or Firm* — Oliff PLC (57) ABSTRACT

A main body portion is disposed at a regular position by inserting a protrusion into an engaging portion formed in a leg portion of the main body portion in accordance with a forward movement of a sliding mold including the protrusion. Then, an injection molding mold is completely closed to cause at least a part of a mold surface of the sliding mold to come into contact with the main body portion.

4 Claims, 6 Drawing Sheets

(51) Int. Cl.
    *B29C 45/44*         (2006.01)
    *B29C 45/26*         (2006.01)
    *B29L 31/30*         (2006.01)

(52) U.S. Cl.
    CPC .......... *B29C 45/2602* (2013.01); *B29C 45/44* (2013.01); *B29C 2045/14147* (2013.01); *B29L 2031/3005* (2013.01)

(56) References Cited

U.S. PATENT DOCUMENTS

| | | |
|---|---|---|
| 2007/0051823 A1 | 3/2007 | Amano et al. |
| 2010/0239826 A1 | 9/2010 | Hiroe |
| 2015/0352766 A1* | 12/2015 | Hontheim ............... B29C 45/80 264/39 |

FOREIGN PATENT DOCUMENTS

| | | |
|---|---|---|
| CN | 1927570 A | 3/2007 |
| CN | 101837764 A | 9/2010 |
| CN | 103085200 A | 5/2013 |
| JP | 2003-165137 A | 6/2003 |
| JP | 2007-069517 A | 3/2007 |
| JP | 2007-076317 A | 3/2007 |

OTHER PUBLICATIONS

Nov. 2, 2015 International Search Report issued in Patent Application No. PCT/JP2015/076524.
Nov. 2, 2015 Written Opinion of the International Seraching Authority issued in Patent Application No. PCT/JP2015/076524.

* cited by examiner

PILLAR GARNISH MANUFACTURING METHOD

TECHNICAL FIELD

The present invention relates to a pillar garnish manufacturing method in which an elongated first member and a second member are integrally formed by performing injection molding of the second member with respect to an outer surface of the first member.

BACKGROUND ART

Patent Reference 1, for example, discloses a pillar garnish manufacturing method of a pillar garnish mounted along a pillar of a vehicle. In the manufacturing method, after performing an injection molding of a main body member with a rigid polymer material, the main body member is set in an injection molding mold for molding a cushion member. By injecting and filling a flexible polymer material in the injection molding mold, the cushion member is molded and the cushion member is joined to the main body member. Accordingly, a pillar garnish in which the main body member and the cushion member are integrally formed is obtained.

In the method disclosed in Patent Reference 1, when closing a movable mold and moving a slide mold forward to close the injection molding mold in which the main body member is set, a mold inclined surface of a sliding mold comes into contact with an edge inclined surface of the main body member while fitting a protruded part of the sliding mold into a recessed groove of the main body member. Accordingly, the main body member is fixed to a mold surface of the injection molding mold in a closely contacting state.

PRIOR ART REFERENCE

Patent Reference

[Patent Reference 1] JP-A-2007-76317

DISCLOSURE OF THE INVENTION

Problems that the Invention is to Solve

However, in the manufacturing method disclosed in Patent Reference 1, when the main body member is set in the injection molding mold, a part of the main body member may float up from the injection molding mold due to a variation in an outline shape of the main body member or a warpage thereof in a longitudinal direction. In such case, since the main body member is not disposed in a regular position, when the sliding mold is moved forward to close the injection molding mold, the protruded part of the sliding mold may come into contact with a part of the main body member which is not the recessed groove and thus the main body member may be damaged.

Therefore, an object of the invention is to prevent a damage of a first member when closing an injection molding mold, at the time of manufacturing a pillar garnish in which the first member and a second member are integrally formed by performing injection molding of the second member with respect to an outer surface of the first member.

Solution to Problem

In order to solve the above-described problem, according to an aspect of the invention, there is provided a pillar garnish manufacturing method in which an elongated first member and a second member are integrally formed by performing injection molding of the second member with respect to at least a part of an outer surface of the first member, wherein an injection molding mold for injection molding of the second member includes: a fixed mold; a movable mold which is capable of performing opening/closing movement; and a sliding mold which is disposed on one of the fixed mold and the movable mold and capable of performing forward/backward movement in a direction intersecting with an opening/closing movement direction of the movable mold, wherein a protrusion protruding in a forward movement direction of the sliding mold is provided to the sliding mold, wherein the first member includes a head portion and a leg portion protruding from the head portion, and wherein an engaging portion capable of being engaged with the protrusion is provided to the leg portion, the method including: a setting step of setting the first member in the one of the fixed mold and the movable mold on which the sliding mold is disposed, when the injection molding mold is opened; a cavity forming step of forming a molding cavity for molding the second member by disposing the first member at a predetermined regular position by moving the sliding mold forward and inserting the protrusion into the engaging portion, and then closing the injection molding mold to cause at least a part of a mold surface of the sliding mold, other than a mold surface of the protrusion, to come into contact with the first member; and a second member molding step of molding the second member by injecting and filling a heated and molten elastic polymer material in the molding cavity, and joining the first member and the second member to be integrally formed.

In this manufacturing method, when the first member is set in the setting step, even in a case where the first member is not disposed at the regular position due to a variation in an outline shape of the first member or a warpage thereof in a longitudinal direction, the protrusion is inserted into the engaging portion in accordance with the forward movement of the sliding mold in the cavity forming step. Accordingly, the first member can be disposed at the regular position. After that, the injection molding mold is closed and the mold surface of the sliding mold comes into contact with the first member. Thus, a collision of the mold surface of the sliding mold with an unexpected position of the first member can be avoided. Therefore, it is possible to prevent damage on the first member when closing the injection molding mold.

In addition, since the mold surface of the sliding mold comes into contact with the first member in a state where the first member is disposed at the regular position, it is possible to properly cause the mold surface of the sliding mold to come into close contact with the first member. Therefore, the injected elastic polymer material does not enter a space between the mold surface of the sliding mold and the first member, and thus it is possible to prevent burr from being generated.

A configuration in which the protrusion includes a mold inclined surface inclined with respect to the forward movement direction of the sliding mold, and an inner wall inclined surface is formed to a portion of the engaging portion which corresponds to the mold inclined surface at the time of inserting the protrusion may be adopted. In this case, in the cavity forming step, when the sliding mold is moved forward to insert the protrusion into the engaging portion, the first member is pressed towards the regular position due to the mold inclined surface sliding along the inner wall inclined surface. By doing so, even in a case where the first member is not disposed at the regular position when the first member is set in the setting step, it is possible to smoothly move the first member to the regular position in accordance with the forward movement of the sliding mold.

The engaging portion may be a penetration hole formed in the leg portion. By doing so, there are no particular difficulties regarding the formation of the engaging portion.

In this case, a configuration in which a recess, which continues with the engaging portion when the first member is disposed at the regular position, is formed in the one of the fixed mold and the movable mold on which the sliding mold is disposed may be adopted. In such case, in the cavity forming step, when the sliding mold is moved forward to insert the protrusion into the engaging portion, the protrusion is engaged with the engaging portion and the recess due to the front edge portion of the protrusion passing through the engaging portion and being received by the recess. By doing so, the protrusion of the sliding mold can be formed to be long by a depth of the recess. Therefore, even if the first member greatly floats when the first member is set in the setting step, the protrusion of the sliding mold can be inserted into the engaging portion (penetration hole).

An end surface of the sliding mold, which is adjacent to the molding cavity and comes into contact with the first member when the injection molding mold is closed, may be formed so as to be orthogonal to the forward movement direction of the sliding mold. By doing so, it is possible to cause a force generated in the forward movement direction of the sliding mold to efficiently act with respect to the first member through the end surface of the sliding mold. Therefore, the injected elastic polymer material is more reliably prevented from entering the space between the mold surface of the sliding mold and the first member, and thus it is possible to enhance the effect of preventing generation of burr.

MODE FOR CARRYING OUT THE INVENTION

Hereinafter, examples of the preferred embodiment will be described in detail with reference to the accompanying drawings. In each drawing used in the following description, the scale is appropriately changed in order to obtain a size by which each member can be recognized.

Figure 1:
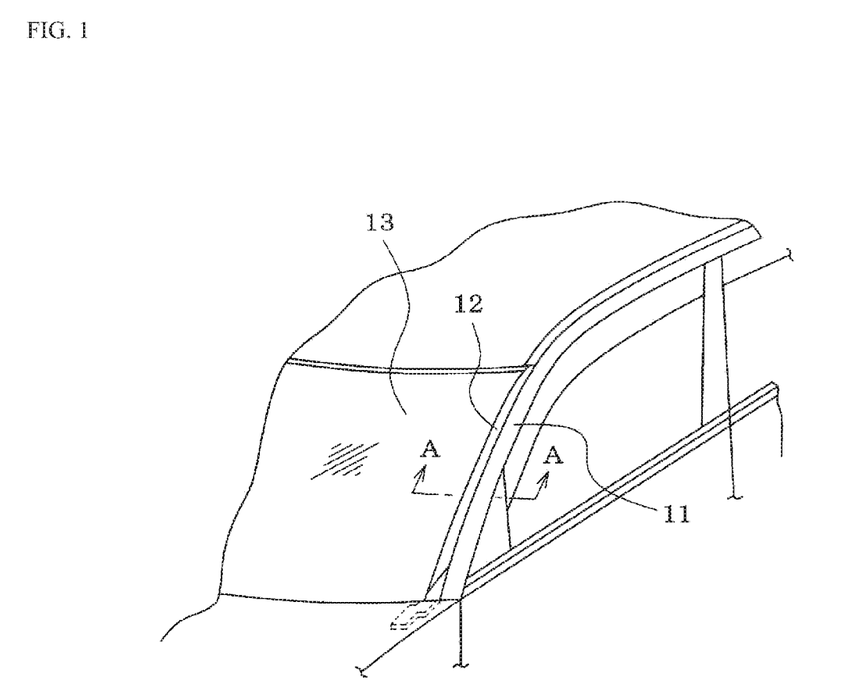
FIG. 1 is a perspective view of a front pillar and peripheral parts thereof of a vehicle showing a state in which a pillar garnish according to one embodiment of the invention is mounted.

As shown in FIG. 1, an elongated pillar garnish 12 is mounted along a front pillar 11 of a vehicle. A space between the front pillar 11 and a window plate 13 (front glass) is covered with the pillar garnish 12.

Figure 2:
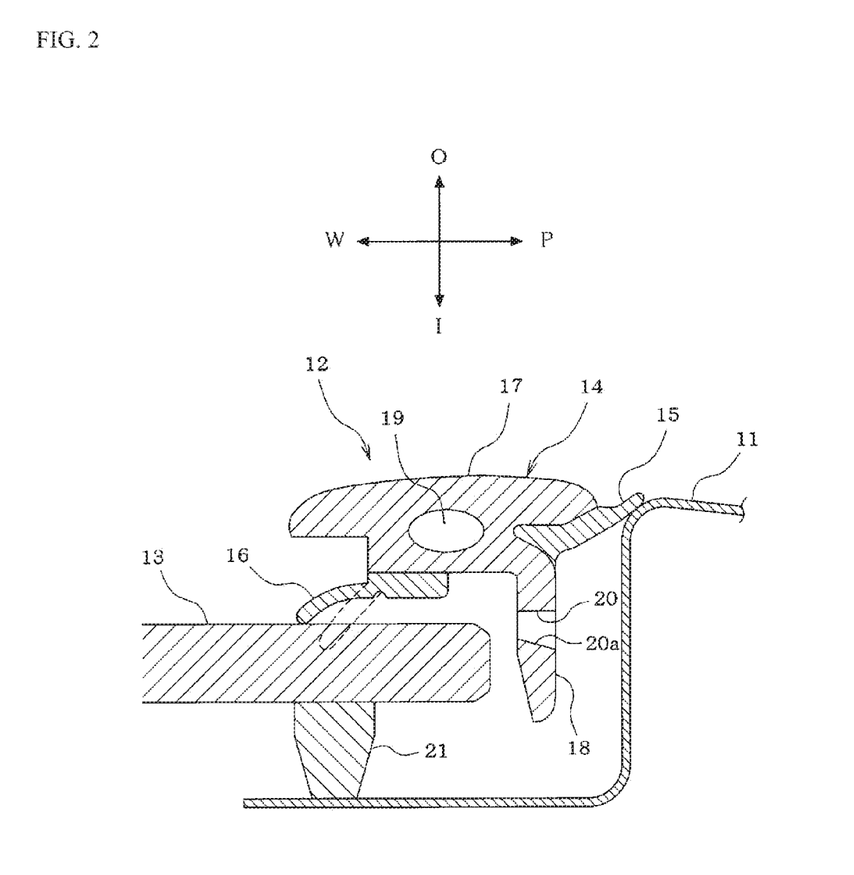
FIG. 2 is a sectional view taken along line A-A of FIG. 1.

In FIG. 2, an arrow O indicates an outer side of the vehicle. An arrow I indicates an inner side of the vehicle. An arrow P indicates a direction close to the front pillar 11. In the following description, this direction is referred to as a "pillar side". An arrow W indicates a direction close to the window plate 13. In the following description, this direction is referred to as a "window plate side".

Figure 3:
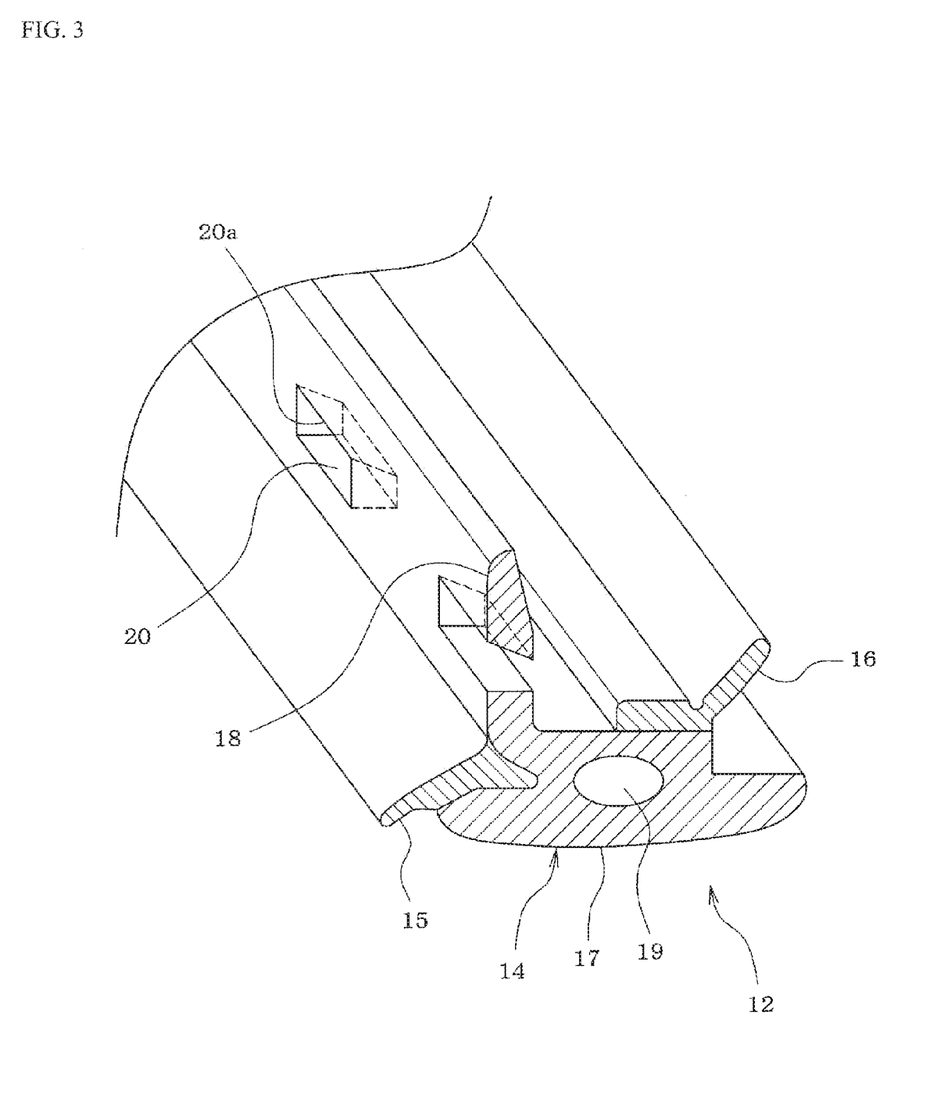
FIG. 3 is a perspective view of a pillar garnish.

As shown in FIGS. 2 and 3, in the pillar garnish 12, injection molding of an outward cushion portion 15 (an example of a second member) and an inward cushion portion 16 (an example of the second member) is performed with respect to an outer surface of an elongated main body portion 14 (an example of a first member), and the main body portion 14 and the cushion portions 15 and 16 are integrally joined to each other. The main body portion 14 includes a head portion 17 and a leg portion 18. The head portion 17 and the leg portion 18 are integrally and inseparably formed. The leg portion 18 protrudes from the pillar side of the head portion 17. A hollow portion 19 is formed in the head portion 17. A plurality of engaging portions 20 are formed to the leg portion 18. Although not shown, the plurality of engaging portions 20 are arranged along a longitudinal direction of the main body portion 14. Each engaging portion 20 is formed in the leg portion 18 as a penetration hole. The elastically deformable outward cushion portion 15 is joined to the pillar side of the main body portion 14. The elastically deformable inward cushion portion 16 is joined to the window plate side of the main body portion 14.

As shown in FIG. 2, when the pillar garnish 12 is mounted along the front pillar 11, the outward cushion portion 15 comes into contact with the front pillar 11 and the inward cushion portion 16 comes into contact with the window plate 13. An elastically deformable dam rubber 21 is bonded to a peripheral part of a back surface of the window plate 13.

The main body portion 14 (head portion 17 and the leg portion 18) is molded with a rigid polymer material having rigidity higher than that of the outward cushion portion 15 and the inward cushion portion 16. Examples of the polymer material include thermoplastic synthetic resins such as an acrylonitrile butadiene styrene resin (ABS resin), an acrylonitrile ethylene propylene styrene resin (AES resin), a rigid or semi-rigid polyvinyl chloride resin (rigid PVC resin), a polycarbonate resin (PC resin), a polypropylene resin (PP resin), a polyethylene resin (PE resin), a polystyrene resin (PS resin), a polyamide resin (PA resin), or a polymethyl methacrylate resin (PMMA resin).

Meanwhile, the outward cushion portion 15 and the inward cushion portion 16 are molded with a more flexible and elastic polymer material, compared to that of the main body portion 14. Examples of the elastic polymer material include thermoplastic synthetic resins or rubber such as an olefin thermoplastic elastomer (TPO), a styrene thermoplastic elastomer (SBC), or a flexible PVC resin. It is preferable that the elastic polymer material for molding the outward cushion portion 15 and the inward cushion portion 16 has compatibility with the polymer material for molding the main body portion 14.

Next, a manufacturing method of the pillar garnish 12 will be described with reference to FIGS. 4 to 7. First, a main body portion molding step is performed. In this step, the main body portion 14 including the hollow portion 19 is molded by performing gas-assisted injection molding by using a full shot method or a short shot method. Specifically, a cavity of an injection molding mold (not shown) for the injection molding of the main body portion 14 is injected and filled with a polymer material for molding the main body portion and gas for forming the hollow portion (for example, nitrogen gas) is injected.

After that, the injection molding of the outward cushion portion 15 and the inward cushion portion 16 is performed.

Figure 4:
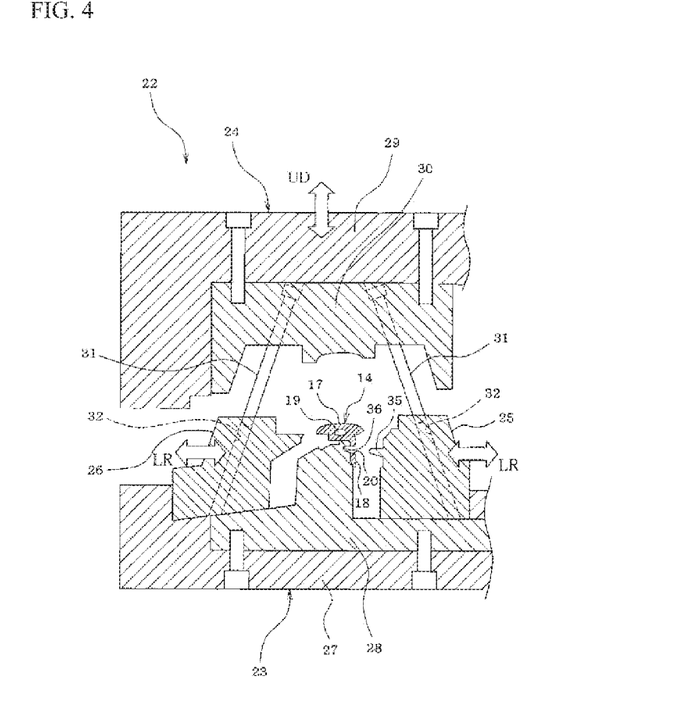
FIG. 4 is a view showing a state in which an injection molding mold is opened.

As shown in FIG. 4, an injection molding mold 22 for performing injection molding of the outward cushion portion 15 and the inward cushion portion 16 includes a fixed mold 23, a movable mold 24, and sliding molds 25 and 26. The movable mold 24 is capable of performing opening/closing movement in a vertical direction UD with respect to the fixed mold 23. The sliding molds 25 and 26 is capable of performing forward/backward movement in a horizontal direction LR (direction intersecting with an opening/closing movement direction of the movable mold 24) with respect to the fixed mold 23. The fixed mold 23 is formed by fixing a mold main body portion 28 to a mold plate 27. The movable mold 24 is formed by fixing a mold main body portion 30 to a mold plate 29.

The sliding molds 25 and 26 are disposed on the mold main body portion 28 of the fixed mold 23. Each of the sliding molds 25 and 26 includes a pin hole 32. The main body portion 30 of the movable mold 24 includes tilting pins 31 (angular pins). Each tilting pin 31 is inserted into the corresponding pin hole 32. Accordingly, the sliding molds 25 and 26 are configured to perform the forward/backward movement synchronously with (along with) the opening/closing movement of the movable mold 24. When the injection molding mold 22 is opened (that is, the movable mold 24 is opened), the sliding molds 25 and 26 move backward (move in directions separated from each other) along with the opening operation of the movable mold 24. Meanwhile, when the injection molding mold 22 is closed (that is, the movable mold 24 is closed), the sliding molds 25 and 26 move forward (move in directions coming close to each other) along with the closing operation of the movable mold 24.

Figure 7:
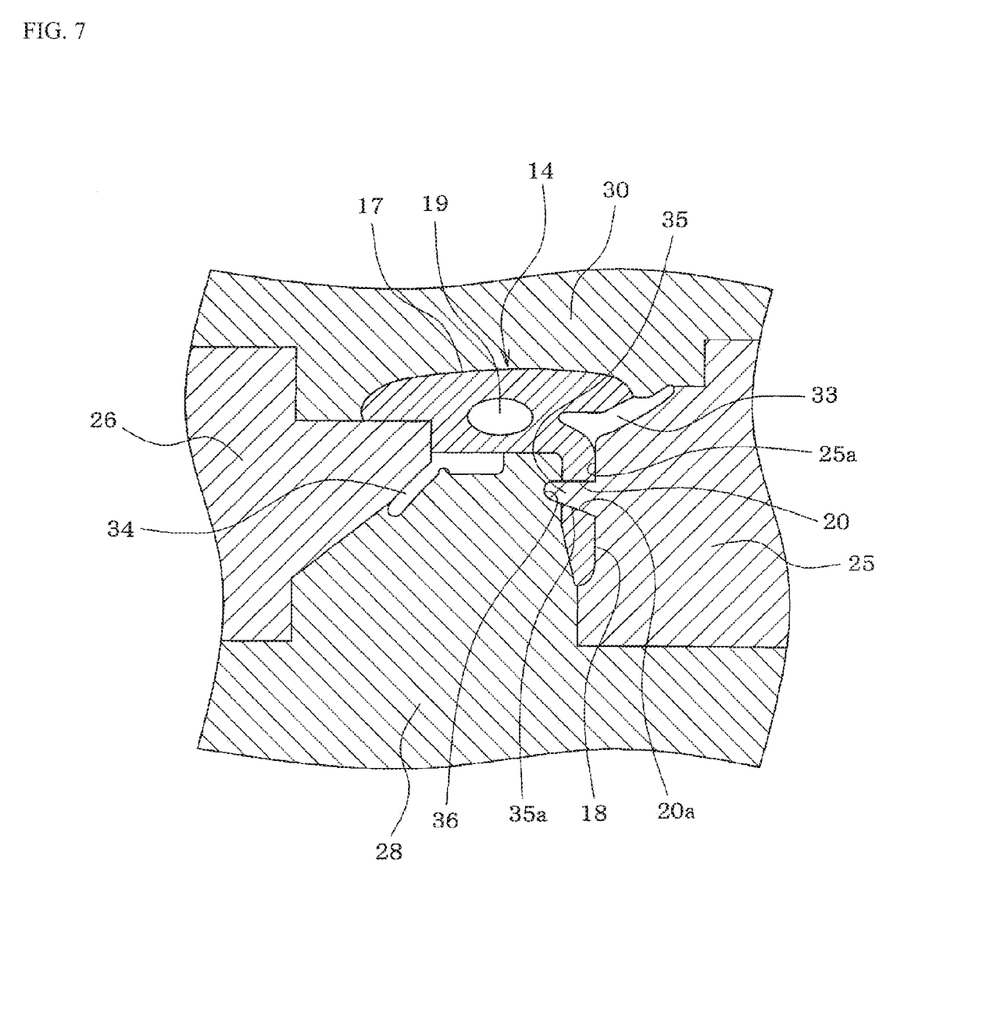
FIG. 7 is a view showing a state in which the injection molding mold is closed.

As shown in FIG. 7, when the injection molding mold 22 is closed in a state where the main body portion 14 is set (loaded) in the mold main body portion 28 of the fixed mold 23, molding cavities 33 and 34 for molding the cushion portions 15 and 16 are formed by molding surfaces of the injection molding mold 22 (a molding surface of the mold main body portion 28 of the fixed mold 23, a molding surface of the mold main body portion 30 of the movable mold 24, and molding surfaces of the sliding molds 25 and 26) and the main body portion 14.

Figure 5:
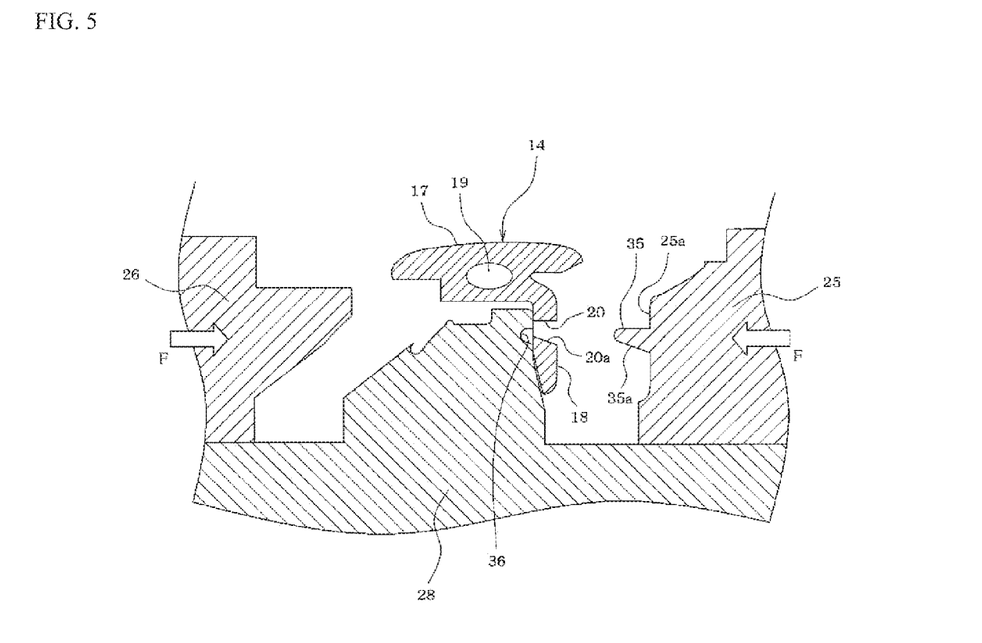
FIG. 5 is a view showing a state in which the injection molding mold is being closed.
Figure 6:
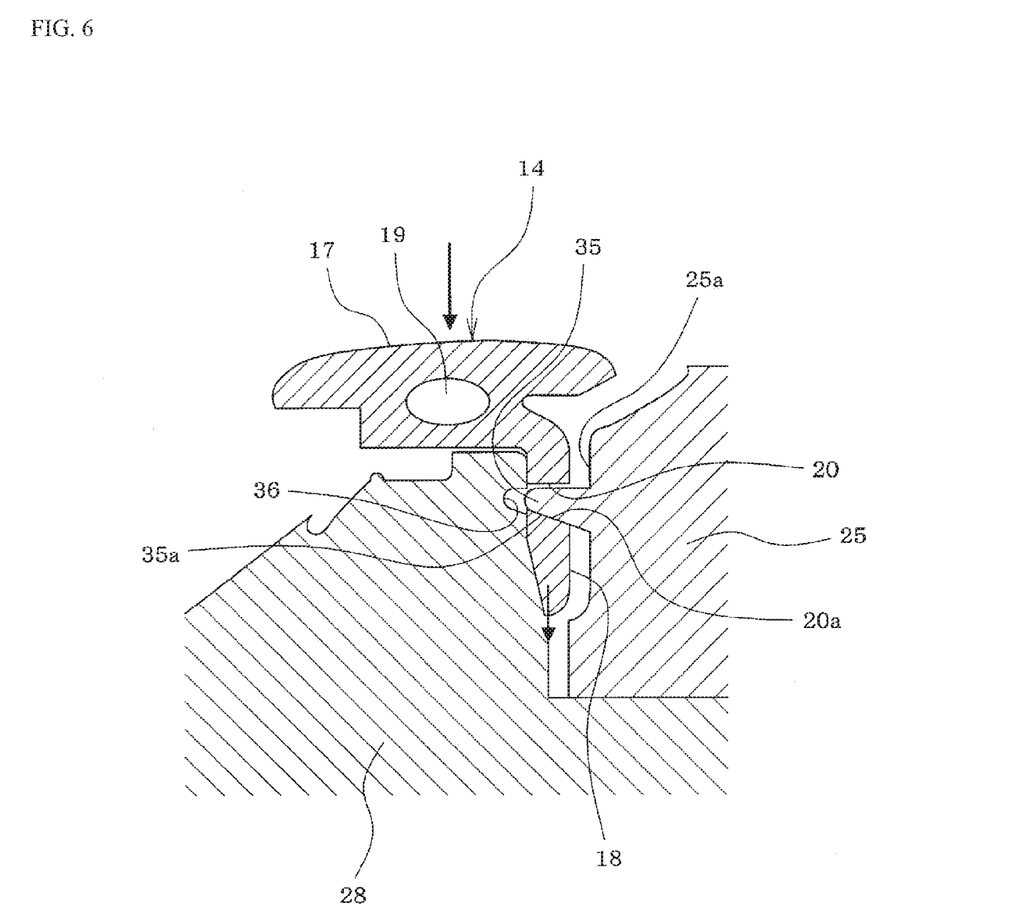
FIG. 6 is a view showing a state in which the injection molding mold is being closed.

As shown in FIGS. 5 and 6, the sliding mold 25 which is on a side (pillar side) coming into contact with the leg portion 18 of the main body portion 14 includes a plurality of protrusions 35. The plurality of protrusions 35 protrudes from an end surface 25a of the sliding mold 25 in the same direction as a forward movement direction F of the sliding mold 25. Although not shown, the plurality of protrusions 35 are arranged in a direction corresponding to the longitudinal direction of the main body portion 14. That is, the plurality of protrusions 35 are provided on portions capable of being engaged with the plurality of engaging portions 20 formed in the leg portion 18 of the main body portion 14.

A mold inclined surface 35a inclined with respect to the forward movement direction F of the sliding mold 25 is formed on a lower side portion of each protrusion 35. Meanwhile, at the lower side portion of the engaging portion 20, an inner wall inclined surface 20a is formed at a portion corresponding to the mold inclined surface 35a. Accordingly, as shown in FIG. 6, when the sliding mold 25 is moved forward to insert the protrusion 35 into the engaging portion 20, the mold inclined surface 35a of the protrusion 35 slides along the inner wall inclined surface 20a of the engaging portion 20. Thus, the main body portion 14 is drawn to a regular position (position at which the main body portion 14 is disposed without floating from the mold main body portion 28 of the fixed mold 23) which is shown by arrows.

In addition, as shown in FIGS. 5 to 7, a recess 36, which continues with the engaging portion 20 when the main body portion 14 is disposed at the regular position, is formed in the mold main body portion 28 of the fixed mold 23 (a side of the mold main body portion 28 where the sliding molds 25 and 26 are disposed). When the main body portion 14 is disposed at the regular position by inserting the protrusion 35 into the engaging portion 20 in accordance with the forward movement of the sliding mold 25, a front edge portion of the protrusion 35 passes through the engaging portion 20 and is fit into the recess 36. Accordingly, the protrusion 35 is engaged with the engaging portion 20 and the recess 36.

The end surface 25a of the sliding mold 25, which is adjacent to the molding cavity 33 and comes into contact with the main body portion 14 when the injection molding mold 22 is closed, is formed so as to be orthogonal to the forward movement direction F of the sliding mold 25.

In order to manufacture the pillar garnish 12, the main body portion molding step described above is performed to perform the injection molding of the main body portion 14, and then, a setting step is performed. Specifically, as shown in FIG. 4, when the injection molding mold 22 for performing injection molding of the outward cushion portion 15 and the inward cushion portion 16 is opened (when the movable mold 24 is opened and the sliding molds 25 and 26 are moved backward), the main body portion 14 is set in the mold main body portion 28 of the fixed mold 23 (the side of the mold main body portion 28 where the sliding molds 25 and 26 are disposed).

Next, a cavity forming step is performed. Specifically, the injection molding mold 22 is closed by closing the movable mold 24 and moving the sliding molds 25 and 26 forward, and a molding cavity 33 for molding the outward cushion portion 15 and a molding cavity 34 for molding the inner cushion portion 16 are formed (see FIG. 7).

In the cavity forming step, by moving the sliding molds 25 and 26 forward to insert the protrusion 35 into the engaging portion 20 (penetration hole), the main body portion 14 is disposed at the regular position before the injection molding mold 22 is completely closed. After that, by completely closing the injection molding mold 22, at least a part of a mold surface of the sliding molds 25 and 26, other than a mold surface of the protrusion 35, comes into contact with the main body portion 14.

More specifically, as shown in FIG. 6, when the protrusion 35 is inserted into the engaging portion 20 in accordance with the forward movement of the sliding mold 25, the mold inclined surface 35a of the protrusion 35 slides along the inner wall inclined surface 20a of the engaging portion 20, and accordingly, the main body portion 14 is drawn to the regular position shown by arrows. Finally, the protrusion 35 is engaged with the engaging portion 20 and the recess 36 due to the front edge portion of the protrusion 35 passing through the engaging portion 20 and being fit into the recess 36.

Next, a cushion portion molding step (an example of a second member molding step) is performed. Specifically, the molding cavity 33 for molding the outward cushion portion 15 and the molding cavity 34 for molding the inner cushion portion 16 are injected and filled with a heated and molten elastic polymer material for molding the cushion portion. Accordingly, the outward cushion portion 15 and the inward cushion portion 16 are molded and integrally joined with the main body portion 14. As a result, the pillar garnish 12 in which the outward cushion portion 15 and the inward cushion portion 16 are integrally joined with the main body portion 14 is obtained.

Next, an extraction step is performed. Specifically, when the movable mold 24 is opened and the sliding molds 25 and 26 are moved backward, the injection molding mold 22 is opened and the pillar garnish 12 is extracted. By doing so, the manufacturing of the pillar garnish 12 is completed.

As described above, in the manufacturing method according to the embodiment, by inserting the protrusion 35 formed to the sliding mold 25 into the engaging portion 20 formed in the leg portion 18 of the main body portion 14, the main body portion 14 is disposed at the regular position before the injection molding mold 22 is completely closed. After that, the injection molding mold 22 is completely closed and the mold surfaces of the sliding molds 25 and 26 come into contact with the main body portion 14.

Accordingly, when the main body portion 14 is set in the mold main body portion 28 of the fixed mold 23 in the setting step, even when a part of the main body portion 14 floats from the mold main body portion 28 (even in a case where the main body portion 14 is not disposed at the regular position) due to a variation in an outline shape of the main body portion 14 or a warpage thereof in a longitudinal direction, the main body portion 14 can be disposed at the regular position through the insertion of the protrusion 35 into the engaging portion 20 in the cavity forming step. Since the mold surfaces of the sliding molds 25 and 26 come into contact with the main body portion 14 after the main body portion 14 is disposed at the regular position in such manner, a collision of the mold surfaces of the sliding molds 25 and 26 with an unexpected position of the main body portion 14 can be avoided. Accordingly, it is possible to prevent damage on the main body portion 14 when closing the injection molding mold 22.

In addition, since the mold surfaces of the sliding molds 25 and 26 come into contact with the main body portion 14 in a state where the main body portion 14 is disposed at the regular position, it is possible to properly cause the mold surfaces of the sliding molds 25 and 26 to come into close contact with the main body portion 14. Therefore, the elastic polymer material injected into the molding cavities 33 and 34 does not enter the space between the mold surfaces of the sliding molds 25 and 26 and the main body portion 14, and thus it is possible to prevent burr from being generated.

The engaging portion 20 according to the embodiment is formed in the leg portion 18 of the main body portion 14 as a penetration hole. Thus, there are no particular difficulties regarding the formation of the engaging portion 20.

In the cavity forming step according to the example, when the protrusion 35 is inserted into the engaging portion 20 in accordance with the forward movement of the sliding mold 25, the mold inclined surface 35a formed on the protrusion 35 slides along the inner wall inclined surface 20a formed on the engaging portion 20, and the main body portion 14 is pressed toward a direction of the regular position. Therefore, even in a case where the main body portion 14 is not disposed at the regular position when the main body portion 14 is set in the mold main body portion 28 of the fixed mold 23 in the setting step, it is possible to smoothly move the main body portion 14 to the regular position in accordance with the forward movement of the sliding mold 25.

In the cavity forming step according to the embodiment, when the protrusion 35 is inserted into the engaging portion 20 in accordance with the forward movement of the sliding mold 25, the front edge portion of the protrusion 35 passes through the engaging portion 20 and is fit into the recess 36 formed in the mold main body portion 28 of the fixed mold 23. Accordingly, the protrusion 35 is engaged with the engaging portion 20 and the recess 36. Accordingly, the protrusion 35 of the sliding mold 25 can be formed to be long by a depth of the recess 36. Therefore, even when the main body portion 14 greatly floats from the mold main body portion 28 when the main body portion 14 is set in the mold main body portion 28 in the setting step, the protrusion 35 of the sliding mold 25 can be inserted into the engaging portion 20.

In the embodiment, the end surface 25a of the sliding mold 25, which is adjacent to the molding cavity 33 and comes into contact with the main body portion 14 when the injection molding mold 22 is closed, is formed so as to be orthogonal to the forward movement direction of the sliding mold 25. Accordingly, it is possible to cause a force generated in the forward movement direction of the sliding mold 25 to efficiently act with respect to the main body portion 14 through the end surface 25a of the sliding mold 25. Therefore, the elastic polymer material injected into the molding cavity 33 is more reliably prevented from entering the space between the mold surface of the sliding mold 25 and the main body portion 14, and thus it is possible to enhance an effect of preventing generation of burr.

The number and shape of the protrusions 35, the recesses 36, and the engaging portions 20 can be appropriately determined in accordance with the specification of the pillar garnish 12. For example, in the embodiment, the shape of the recess 36 is determined so that the front edge portion of the protrusion 35 is fit into the recess. However, the shape of the recess 36 can be determined so as to receive the front edge portion of the protrusion 35 without the fitting, as long as the movement of the front edge portion of the protrusion 35 is not disturbed at the time of the engaging.

In the embodiment, the engaging portion 20 is formed in the leg portion 18 as a penetration hole. However, the engaging portion 20 can be formed as a recess which does not penetrate through the leg portion 18. In this case, the recess 36 formed in the mold main body portion 28 of the fixed mold 23 in the embodiment can be omitted.

In the embodiment, the movable mold 24 and the sliding molds 25 and 26 are connected to each other through tilting pins 31, and the sliding molds 25 and 26 performs forward/backward movement synchronously with (along with) the opening/closing movement of the movable mold 24. However, for example, the sliding molds 25 and 26 may perform the forward/backward movement by a driving source (a hydraulic cylinder, an air cylinder, an electrical actuator, and the like) which is different from a driving source of the movable mold 24.

In the embodiment, the sliding molds 25 and 26 are disposed on the side of the mold main body portion 28 of the fixed mold 23. However, the sliding molds 25 and 26 may be disposed on the side of the mold main body portion 30 of the movable mold 24.

In the embodiment, the main body portion 14 of the pillar garnish 12 is molded by the gas-assisted injection molding. However, the molding method of the main body portion 14 can be appropriately changed. For example, the main body portion 14 having no hollow portions may be molded by general injection molding or extrusion molding. The main body portion 14 may be acquired from outside, without manufacturing the same in a manufacturing line of the pillar garnish 12.

In the embodiment, the pillar garnish 12 mounted along a front pillar of a vehicle is used as an example. However, for example, the invention can be applied to any pillar garnish, as long as first member and a second member are integrally formed by performing injection molding of the second member with respect to an outer surface of the first member, such as a pillar garnish mounted along a center pillar or a rear pillar.

The contents of Japanese Patent Application No. 2014-197904, filed Sep. 29, 2014, are incorporated herein by reference as configuring a part of the description of the present application.

The invention claimed is:

1. A pillar garnish manufacturing method in which an elongated first member and a second member are integrally formed by performing injection molding of the second member with respect to at least a part of an outer surface of the first member, wherein an injection molding mold for injection molding of the second member includes: a fixed mold; a movable mold which is capable of performing opening/closing movement; and a sliding mold which is disposed on one of the fixed mold and the movable mold and capable of performing forward/backward movement in a direction intersecting with an opening/closing movement direction of the movable mold, wherein a protrusion protruding in a forward movement direction of the sliding mold is provided to the sliding mold, wherein the first member includes a head portion and a leg portion protruding from the head portion, and wherein an engaging portion capable of being engaged with the protrusion is provided to the leg portion, the method comprising:

a setting step of setting the first member in the one of the fixed mold and the movable mold on which the sliding mold is disposed, when the injection molding mold is opened;

a cavity forming step of forming a molding cavity for molding the second member by disposing the first member at a predetermined regular position by moving the sliding mold forward and inserting the protrusion into the engaging portion, and then closing the injection molding mold to cause at least a part of a mold surface of the sliding mold, other than a mold surface of the protrusion, to come into contact with the first member; and a second member molding step of molding the second member by injecting and filling a heated and molten elastic polymer material in the molding cavity, and joining the first member and the second member to be integrally formed, wherein the protrusion includes a mold inclined surface inclined with respect to the forward movement direction of the sliding mold, wherein an inner wall inclined surface is formed to a portion of the engaging portion which corresponds to the mold inclined surface at the time of inserting the protrusion, and wherein, in the cavity forming step, when the sliding mold is moved forward to insert the protrusion into the engaging portion, the first member is pressed towards the regular position due to the mold inclined surface sliding along the inner wall inclined surface.

2. The pillar garnish manufacturing method according to claim 1, wherein the engaging portion is a penetration hole formed in the leg portion.

3. The pillar garnish manufacturing method according to claim 2, wherein a recess, which continues with the engaging portion when the first member is disposed at the regular position, is formed in the one of the fixed mold and the movable mold on which the sliding mold is disposed, and wherein, in the cavity forming step, when the sliding mold is moved forward to insert the protrusion into the engaging portion, the protrusion is engaged with the engaging portion and the recess due to the front edge portion of the protrusion passing through the engaging portion and being received by the recess.

4. The pillar garnish manufacturing method according to claim 1, wherein an end surface of the sliding mold, which is adjacent to the molding cavity and comes into contact with the first member when the injection molding mold is closed, is formed so as to be orthogonal to the forward movement direction of the sliding mold.

* * * * *